Nov. 29, 1927.
C. G. BARRETT
1,650,929
REVERSING AND CONTROL MECHANISM FOR INTERNAL COMBUSTION ENGINES
Filed Oct. 1, 1923 4 Sheets-Sheet 3
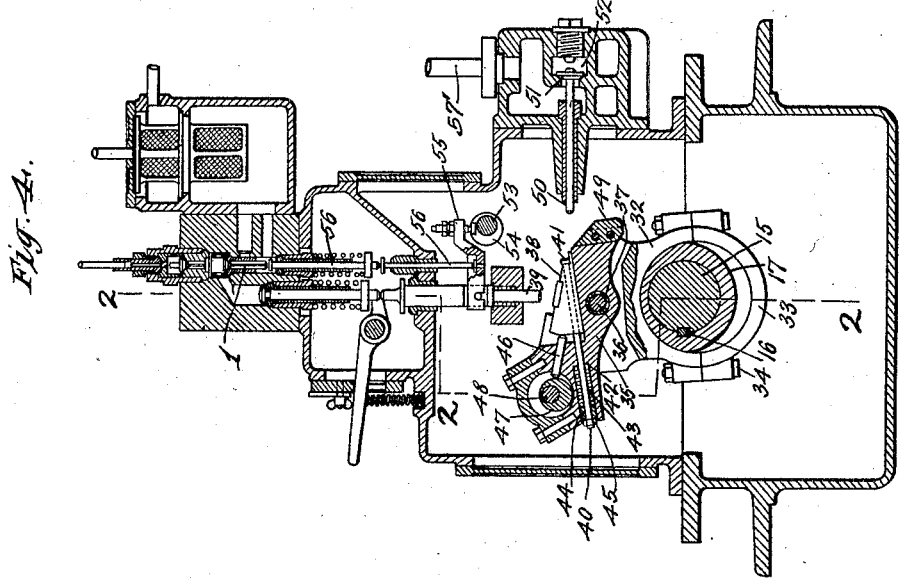
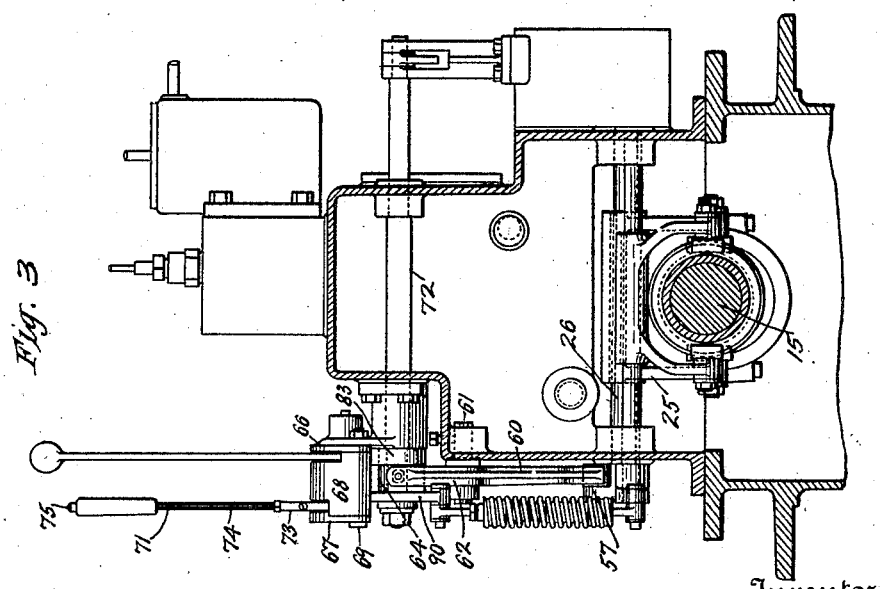
Inventor
Charles G. Barrett
By his Attorneys

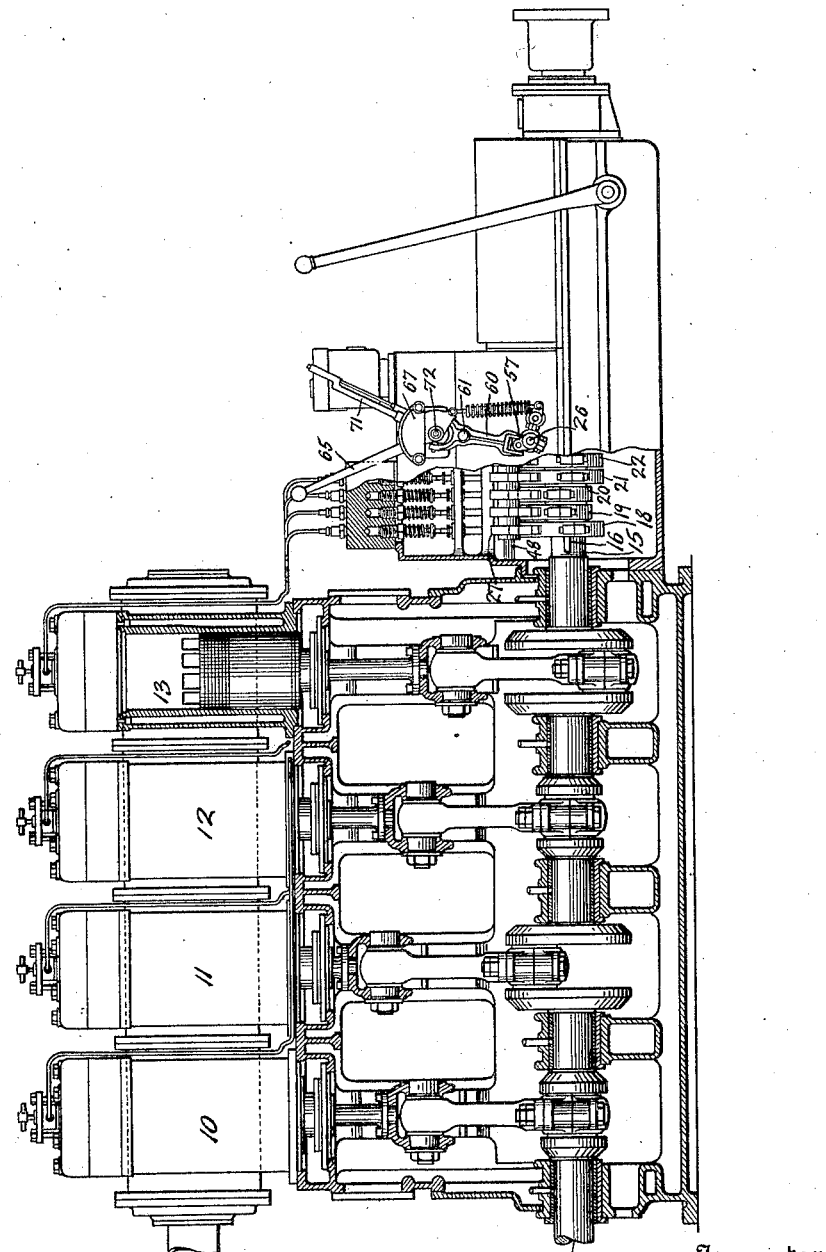

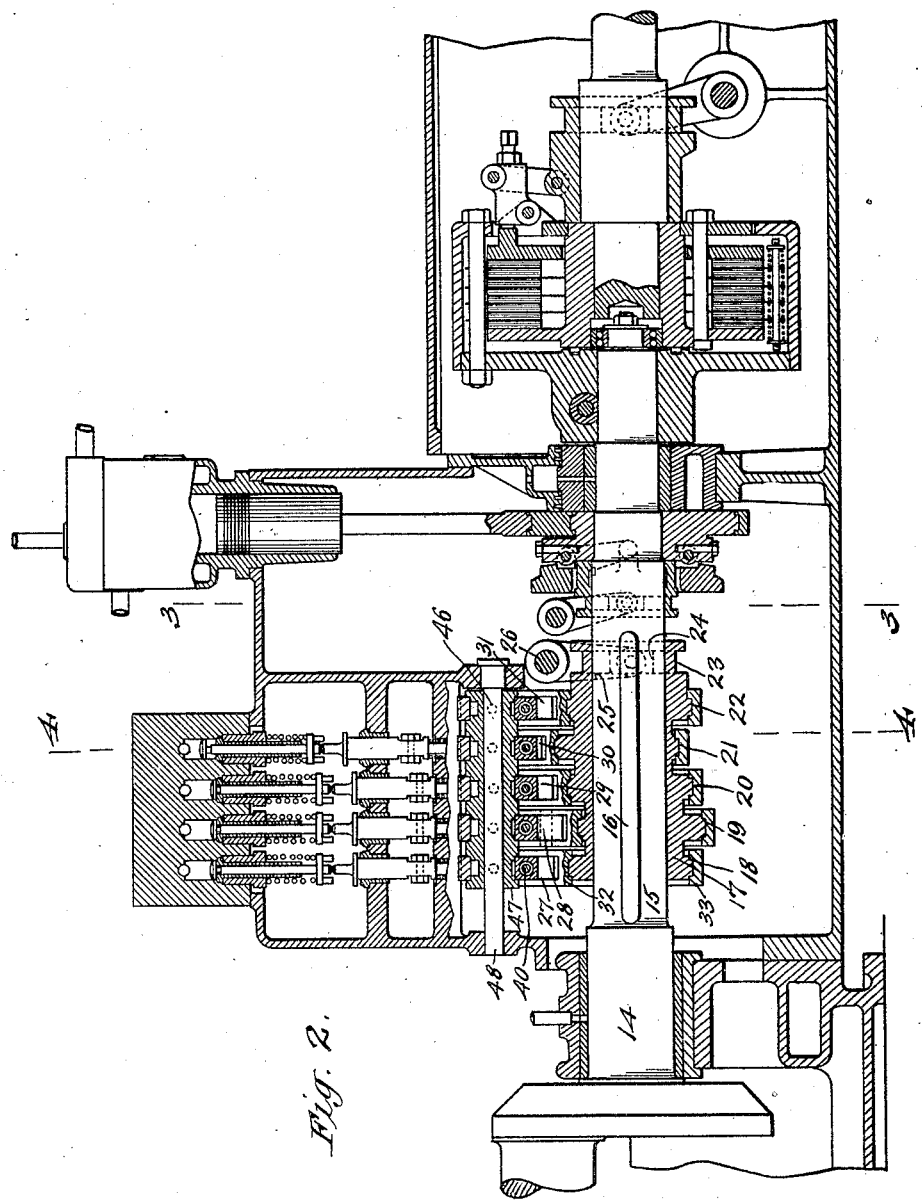

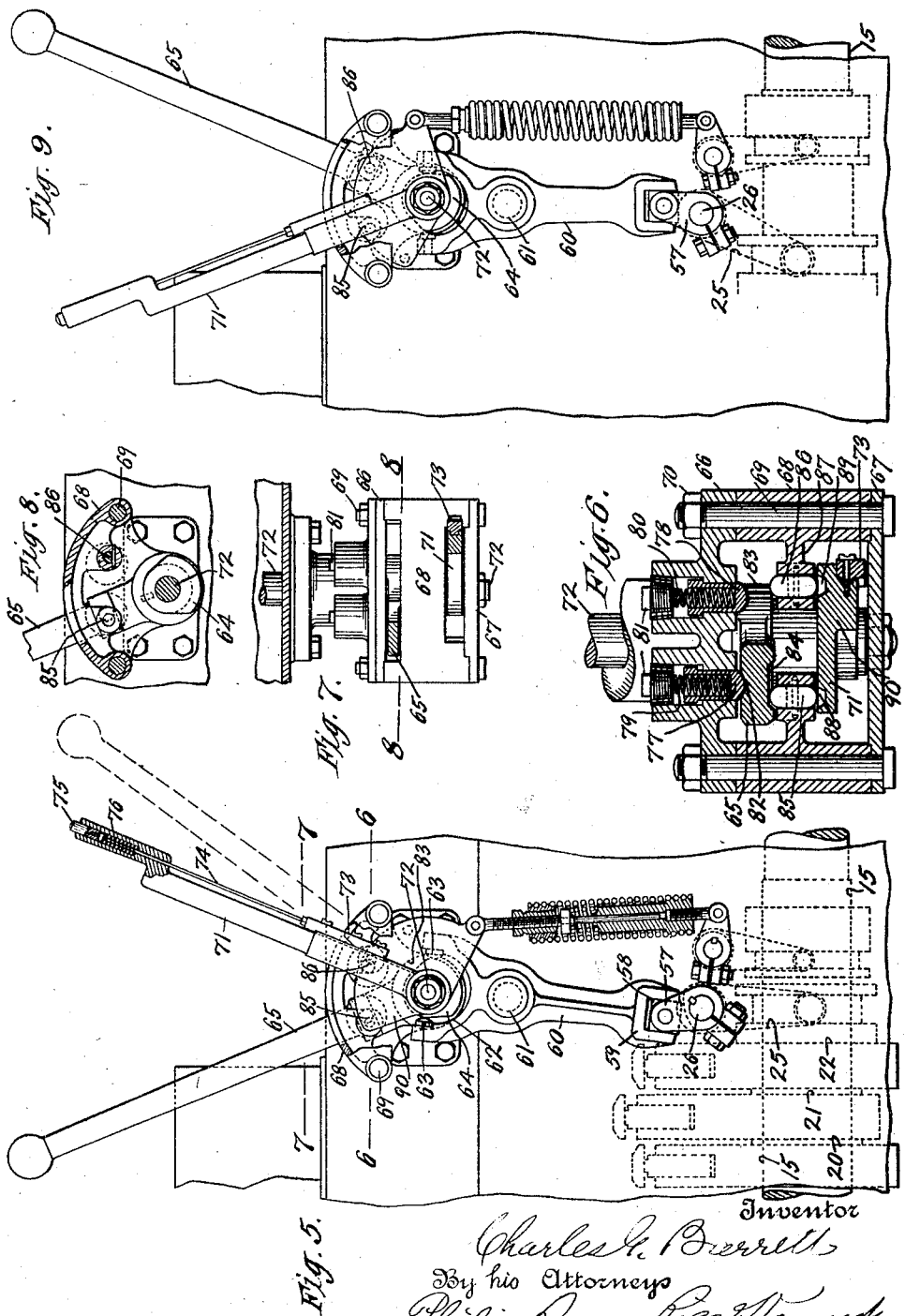

Patented Nov. 29, 1927.

1,650,929

UNITED STATES PATENT OFFICE.

CHARLES G. BARRETT, OF QUINCY, MASSACHUSETTS, ASSIGNOR TO WORTHINGTON PUMP AND MACHINERY CORPORATION, OF NEW YORK, N. Y., A CORPORATION OF VIRGINIA.

REVERSING AND CONTROL MECHANISM FOR INTERNAL-COMBUSTION ENGINES.

Application filed October 1, 1923. Serial No. 665,742.

This invention relates to an internal combustion engine of the reversible type, and more especially the mechanism whereby control and reversal of operation of the engine are effected; and while the invention is of special utility in connection with engines operating on the Diesel principle, and those using liquid fuel, it is nevertheless adaptable to other internal combustion engines of various types and cycles.

Numerous arrangements have heretofore been utilized for regulating the operation of the several valves controlling the actuation of the engine for reversing, but the mechanisms thus far developed and utilized for this purpose have been of complicated construction and otherwise not entirely satisfactory.

It is one of the objects of the present invention to provide a reversing and control gear in which accuracy of timing is inherent in the principle of the operation of the mechanism. More specifically, the invention resides in providing for the operation of the air starting and fuel injection valves by arranging eccentrics positioned relatively between the cranks of the engine and carried on a single shiftable member, so that the movement of this member brings into position the proper eccentrics for reversal.

Another feature of the present invention is a construction for the control gear with the air cams for operating the air starting devices arranged in combination with the fuel injection timing mechanism so that there is a fixed relation between injection timing and air timing, and the adjustment of the injection timing for a given direction of rotation necessarily accurately adjusts the air timing.

Other features of the invention will appear from the following description which refers to the accompanying drawings representing a preferred embodiment of the invention, and the invention will then be specifically pointed out in the claims.

In the drawings—

Figure 1 is a side elevation, partly in section, of an engine constructed according to this invention;

Figure 2 is a vertical section detailing the injection timing mechanism, the section being taken on the line 2—2 of Fig. 4;

Figure 3 is a transverse section on the line 3—3 of Fig. 2;

Figure 4 is a transverse section on the line 4—4 of Fig. 2;

Figure 5 is an enlarged detail view of the manœuvring lever mechanism;

Figure 6 is a sectional view on the line 6—6 of Fig. 5;

Figure 7 is a sectional view on the line 7—7 of Fig. 5;

Figure 8 is a sectional view on the line 8—8 of Fig. 7; and

Figure 9 is a side elevation of the manœuvring lever mechanism in the opposite position from that shown in Fig. 5.

Referring to the drawings:

The engine is comprised of the cylinders 10, 11, 12 and 13 each equipped with the usual mechanism incident to an engine operating on the Diesel principle and connected in the usual manner for effecting rotation of the crank shaft 14.

The end of the crank shaft 14 is extended as at 15 and is splined to receive a key 16, a sleeve 17 being mounted on a crank shaft extension 15 and having a key-way which receives the key 16 so that rotation of the crank shaft also effects rotation of the sleeve 17, and yet the latter may be moved axially of the shaft when desired. The sleeve 17, for the four cylinder engine herein described, is provided with five eccentrics 18, 19, 20, 21 and 22 respectively, the end of said sleeve 17 having a reduced portion 23 which receives the blocks 24 carried on the fork 25 which is keyed to the manœuvring lever shaft 26, so that movements of the shaft 26 will shift the sleeve 17 axially of the crank shaft extension 15.

Co-operating with the eccentrics 18 to 22 inclusive are the eccentric straps 27, 28, 29, 30 and 31, each of which comprises the strap formed by the upper and lower halves 32 and 33 secured together in the usual manner as by bolts 34. The upper half 32 of each strap, only one of which will be described in detail, is bifurcated to accommodate the injection lever 35 which is adapted to rock on a pin 36 surrounded by a bushing 37. The upper face of the injection lever carries an inclined block 38 acting as a cam face for engagement with the pump plunger actuating member 39, said inclined block 38 being carried on a bolt 40, the head 41 of which prevents it from slipping off the end, the other end of the bolt 40 extending through a recess 42 in the injection lever and which recess 42 houses a spring 43 surrounding the stem of the bolt 40, said spring being placed under tension by the washer 44 and the nut 45 screwed on the end of said bolt 40. A pin 46 rests against the rear face of the inclined block 38 and is moved by an eccentric 47 carried on a shaft 48 so that rotation of the shaft 48 moves the pin 46 and consequently displaces the block 38 forwardly against the tension of the spring 43. The forward end of each injection lever has mounted thereon an air cam 49 for co-operation with the stem 50 of the air valve 51 controlling the efflux of air from the air manifold 52 to the air pipe 57', for the supply of starting air to the cylinder corresponding to the injection plunger actuated by the lever, it being understood that there is a valve 51 and an air pipe 57 for each cylinder of the engine and that the supply of air to the air manifold 52 is controlled by a suitable master air valve, not shown. The pump control shown forms no part of the present invention, and any other suitable control may be used. As shown, the fuel control shaft 53 is mounted eccentrically so that its rotation by any suitable engine governor device raises or lowers, and thus shifts the fulcrums of, the levers 55, the other ends of which are connected to the pump plunger actuators 39, so that the levers 55 are rocked by the plungers at each movement, and thus, through rods 56 engaging the valve stems 1, open the suction valves of the pump, during the discharge stroke, at points determined by the position of the control shaft 53.

The injection plungers are four in number, one corresponding to each cylinder of the engine, and may be of the type herein shown or of any other usual type, while the injection levers are five in number corresponding to the five eccentrics which are movable with their respective eccentric straps in an axial direction with respect to the crank shaft extension 15 corresponding to the movement of the eccentric sleeve 17, thus either of the end eccentrics is always idle depending upon the direction of rotation for which the engine is set. The engine herein illustrated is of the four cylinder two-cycle type with the cranks set at 90 degrees; hence, in order to secure satisfactory injection action each fuel eccentric is set 45 degrees behind its corresponding crank of the engine, therefore, if the direction of rotation is to be reversed, and other conditions to remain unchanged, it is evident that any given eccentric will then be 45 degrees ahead of its crank but 45 degrees behind the crank which precedes in crank sequence the one which it has previously been serving. Since the fuel injection pumps are permanently connected to their respective cylinders, it is only necessary to shift the given eccentric to its new position under the next adjacent plunger in order to effect correct timing for reversed rotation, with the condition, however, that this adjacent pump is connected to the cylinder which, when referred to the new direction of rotation, is 90 degrees in crank sequence ahead of the cylinder which the same eccentric previously served. In other words, for the reverse direction of rotation the fuel eccentric sleeve 17 is shifted axially a distance corresponding to the center line spacing of the injection pump plungers and of the fuel eccentrics so as to bring the idle end eccentric in line with its nearest injection plunger and which consequently, simultaneously, throws out of action the other end eccentric and moves the three intermediate eccentrics, respectively, in line with the next adjacent plungers; similarly, this operation automatically adjusts the injection timing for the reverse direction of rotation; and also, since the air cams 49 are mounted directly on their respective injection levers and receive their motion from the fuel eccentrics, and are shifted with the eccentrics, it therefore follows that the placing of the fuel eccentrics in the proper position for correct injection timing for a given direction of rotation necessarily accomplishes correct air timing.

In the operation of the engine the manœuvring lever and its various positions are of considerable importance, and therefore, in order to exercise proper control over the engine a special type of manœuvring lever and mounting are required and such is clearly illustrated in Figs. 5 to 9, inclusive, wherein it is shown that the manœuvring shaft 26, whereby the eccentric sleeve may be shifted axially, carries a crank 57 provided with a block 58 engaged in the forked end 59 of an amplifying lever 60 pivoted at 61 and the upper end of which is bifurcated, as shown at 62, and provided with spots 63 for engagement by the cam 64 on the lower end of the manœuvring lever 65. This manœuvring lever is mounted for swinging action between the inner and outer face plates 66 and 67 spaced apart by the web 68, the whole being tied together by the through bolts 69 and nuts 70. The amount of fuel delivered by the fuel pump is determined by the position of fuel control shaft 53 under control of the engine governor and may be modified by the operation of a fuel control lever 71 suitably connected thereto so as to provide for the by-passing of the entire fuel supply or any desired part thereof. The fuel control lever 71 acting upon the shaft 72 is also carried between the inner and outer face plates 66 and 67 and has a latch 73 actuated by the plunger rod 74 and button 75 tensioned by the spring 76 to retain the fuel control lever in its set position. An interlock between the manœuvring lever 65 and the fuel lever 71, of such construction that it will not permit the manœuvring lever 65 to be thrown over for reversal of rotation of the engine until the fuel control lever 71 is brought to its "no fuel" position, is provided, by which the engine is brought to a stop before reversal can be effected; then, after the manœuvring lever 65 is thrown into the desired position for either the "ahead" or "astern" direction and the master air valve is turned on to supply compressed air to the air manifold 52 for delivery through air valves 51 for air starting, the fuel lever 71 may then be moved to the required "fuel" position, whereupon the engine immediately begins firing, and the master air valve is then turned off to prevent further supply of air to the air manifold 52 and the engine cylinders. In order to accomplish this, the inner face plate 66 is provided with two plungers 77 and 78 pressed inwardly by springs 79 and 80, respectively, which are retained in position by the screw plugs 81. These plungers 77 and 78 engage recesses 82 in the member 83 which is locked to the hub of the manœuvring lever 65. The member 83, on its opposite face, is provided with depressions 84, the edges of which form cams for engagement with the pins 85 and 86 sliding in the web 87 of the spacing member 68; said pins 85 and 86 are adapted to engage in recesses 88 and 89 in the member 90 locked to the hub of the fuel lever 71. It will thus be seen that when the fuel lever 71 is in the "no fuel" position shown in Fig. 5, the recesses 88, 89 in member 90 are in the positions shown in Fig. 6, that is, in alinement with the axes of the pins 85, 86. The manœuvring lever 65 is thus free to be moved to the "ahead" position shown in Fig. 5, or "astern" position shown in Fig. 9, due to the pins 85, 86 being at such time free to be moved into the recesses 88, 89 by engagement of the pins with the edges of the depressions 84 on the face of the member 83. It follows, therefore, that until the fuel lever 71 has been moved to bring the recesses 88, 89 into the positions referred to, and as shown in Fig. 6, the pins 85, 86 are not free to move, so that the manœuvring lever 65 is locked in position until the fuel lever is swung to "no fuel" position.

From the foregoing description it will be apparent that the invention, while herein applied to a four cylinder two-cycle engine of the Diesel type may, by proper modification, be made equally applicable to any multi-cylinder engine of either the two or four-cycle type, whether of the preignition type or not, it only being necessary that there shall be such a number of cylinders that the maximum crank angle is not in excess of 120 degrees.

What is claimed is:

1. In an internal combustion engine, the combination with a plurality of working cylinders and their pistons and a shaft driven thereby, of consecutive cranks carried by said shaft, reversing and control gear for said engine, consecutive fuel injectors for said cylinders, eccentrics arranged to actuate the fuel injectors, said eccentrics being set on angles midway between the consecutive cranks and arranged to operate one or the other of adjacent injectors without changing the angle of said eccentrics relatively to the cranks.

2. In an internal combustion engine, the combination with a plurality of working cylinders and their pistons and a shaft driven thereby, of consecutive cranks carried by said shaft, consecutive fuel injectors for the cylinders, eccentrics arranged to actuate the fuel injectors, said eccentrics being set on angles midway between the consecutive cranks and arranged to operate one or the other of adjacent injectors without changing the angles of said eccentrics relatively to the cranks, and reversing and control gear including means for shifting the eccentrics axially for effecting reversal of the engine.

3. In an internal combustion engine, the combination with a plurality of working cylinders and their pistons, and a shaft driven thereby, of consecutive cranks carried by said shaft, consecutive fuel injectors for the cylinders, fuel eccentrics arranged to actuate said injectors, said eccentrics being set on angles midway between the consecutive cranks and arranged to actuate one or the other of adjacent injectors without changing the angle of said eccentrics relatively to the cranks, a shiftable sleeve on which said eccentrics are mounted, said sleeve carrying a number of eccentrics exceeding the fuel injectors by one, and reversing and control gear including means for shifting the sleeve axially for reversal of the engine.

4. In an internal combustion engine, the combination with a plurality of working cylinders and their pistons and a shaft driven thereby, of consecutive cranks carried by said shaft, fuel injectors for the cylinders, a shiftable sleeve mounted on said shaft, eccentrics carried by said sleeve and arranged to actuate said injectors consecutively, injection levers mounted for actuation by said eccentrics, said eccentrics and injection levers being shiftable with said sleeve, and reversing and control gear including means for shifting the sleeve axially for effecting reversal of the engine.

5. In an internal combustion engine, the combination with a plurality of cylinders and their pistons and a shaft driven thereby, of consecutive cranks carried by said shaft, fuel injectors for the cylinders, a shiftable sleeve, eccentrics carried by said sleeve, said eccentrics being set on angles midway between consecutive cranks and arranged to operate one or the other of the injectors without changing the crank angles of the eccentrics, an injection lever mounted for actuation by each eccentric, said eccentrics and injection levers being shiftable with said sleeve, and reversing and control gear including means for shifting said sleeve axially to effect reversal of the engine.

6. In an internal combustion engine, the combination with a plurality of working cylinders and their pistons and a shaft driven thereby, of consecutive cranks carried by said shaft, fuel injectors for the cylinders, a shiftable sleeve, eccentrics carried by said sleeve, said eccentrics being set on angles midway between consecutive cranks and arranged to operate one or the other of the injectors without changing the angles of the eccentrics relatively to the cranks, an injection lever mounted for actuation by each eccentric, an adjustable inclined actuating face on said actuating levers, said eccentrics and injection levers being shiftable with said sleeve, and reversing and control gear including means for shifting the sleeve axially to effect reversal of the engine.

7. In an internal combustion engine, the combination with a plurality of working cylinders and their pistons and a shaft driven thereby, of consecutive cranks carried by said shaft, reversing and control gear for said engine, an eccentrically actuated fuel injector and an air starting valve for each cylinder, and means whereby an injector and an air starting valve for each cylinder are driven by the same eccentric.

8. In an internal combustion engine, the combination with a plurality of working cylinders and their pistons and a shaft driven thereby, of consecutive cranks carried by said shaft, eccentrically actuated fuel injectors and air starting valves, said eccentrics being set on angles midway between the consecutive cranks and arranged to actuate one or the other of the injectors without changing the angle of the eccentrics relatively to the cranks, means whereby one of said injectors and an air starting valve for each cylinder are driven by the same eccentric, and reversing and control gear including means for shifting the eccentric axially to effect reversal of the engine.

9. In an internal combustion engine, the combination with a plurality of working cylinders and their pistons and a shaft driven thereby, of consecutive cranks carried by said shaft, fuel injectors, air starting valves, eccentric means including levers for actuating said injectors and starting valves, one of said injectors and an air starting valve for each cylinder being driven by the same eccentric, a shiftable sleeve carrying said eccentrics, said sleeve having a number of eccentrics exceeding the fuel injectors by one, said eccentrics being set on angles midway between consecutive cranks and arranged to operate one or the other of consecutive injectors without changing their angles relatively to the cranks, and reversing and control gear including means for shifting said sleeve axially to effect reversal of the engine.

10. In an internal combustion engine, the combination with a plurality of working cylinders and their pistons and a shaft driven thereby, of consecutive cranks carried by said shaft, consecutive fuel injectors, a shiftable sleeve mounted on said shaft, eccentrics carried by said sleeve, said eccentrics being set on angles midway between consecutive cranks and arranged to operate one or the other of the consecutive fuel injectors without changing their angles relatively to the cranks, injection levers, adjustable inclined faces carried by said levers arranged to co-operate with said injectors, said eccentrics and injection levers being shiftable with said sleeve, reversing and control gear including means for shifting the sleeve axially to effect reversal of the engine, and air starting valves actuated by the injection levers.

11. In an internal combustion engine, the combination with a plurality of working cylinders and their pistons and a shaft driven thereby, of consecutive cranks carried by said shaft, consecutive fuel injectors, eccentrics arranged to actuate said fuel injectors, said eccentrics being set on angles midway between consecutive cranks and arranged to operate one or the other of said injectors without changing the angles of said eccentrics relatively to the cranks, and reversing and control gear for said engine including a fuel lever and a manœuvring lever, said gear including interlocking means arranged to co-operate with said levers to prevent movement of the manœuvring lever until the fuel lever is in no fuel position.

In testimony whereof, I have hereunto set my hand.

CHARLES G. BARRETT.